(12) United States Patent
Hu et al.

(10) Patent No.: US 11,586,102 B2
(45) Date of Patent: Feb. 21, 2023

(54) LIGHT SOURCE DEVICE AND PROJECTION SYSTEM

(71) Applicant: APPOTRONICS CORPORATION LIMITED, Shenzhen (CN)

(72) Inventors: Fei Hu, Guangdong (CN); Zuqiang Guo, Guangdong (CN); Peng Du, Guangdong (CN); Yi Li, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 83 days.

(21) Appl. No.: 16/622,478

(22) PCT Filed: Sep. 26, 2017

(86) PCT No.: PCT/CN2017/103437
§ 371 (c)(1),
(2) Date: Jun. 16, 2020

(87) PCT Pub. No.: WO2019/000673
PCT Pub. Date: Jan. 3, 2019

(65) Prior Publication Data
US 2021/0149286 A1    May 20, 2021

(30) Foreign Application Priority Data
Jun. 29, 2017   (CN) .................... 201710517567.X (51) Int. Cl.
*G03B 21/20*    (2006.01)
*G02B 26/00*    (2006.01)

(52) U.S. Cl.
CPC ......... *G03B 21/204* (2013.01); *G02B 26/008* (2013.01); *G03B 21/208* (2013.01); *G03B 21/2073* (2013.01)

(58) Field of Classification Search
CPC .............. G03B 21/204; G03B 21/2073; G03B 21/208; G02B 26/008
See application file for complete search history.

(56) References Cited

U.S. PATENT DOCUMENTS

| 5,079,678 A | 1/1992 | Parker | |
|---|---|---|---|
| 2010/0202129 A1* | 8/2010 | Abu-Ageel | C09K 11/7741 362/293 |

(Continued)

FOREIGN PATENT DOCUMENTS

| CN | 201838620 U | 5/2011 |
|---|---|---|
| CN | 102608854 A | 7/2012 |

(Continued)

OTHER PUBLICATIONS

International Search Report for International Application No. PCT/CN2017/103437 dated Mar. 8, 2018.

(Continued)

*Primary Examiner* — Diane I Lee
*Assistant Examiner* — Nathaniel J Lee
(74) *Attorney, Agent, or Firm* — Marshall, Gerstein & Borun LLP (57) ABSTRACT

A light source device, includes an excitation light source for generating excitation light, a light condensing device, and a fluorescent cavity. The fluorescent cavity includes a chamber and a fluorescent layer, the chamber having a light window for allowing light to enter and exit and a bottom wall opposite to the light window. The fluorescent layer is provided on the surface of the bottom wall. The excitation light is concentrated by the light condensing device, and then is incident from the light window to the surface of the fluorescent layer to form a light spot and excite the fluorescent layer to generate a laser. The area of the light window (Continued)

is smaller than the area of the light spot, and the laser can be emitted from the light window.

16 Claims, 9 Drawing Sheets

(56) References Cited

U.S. PATENT DOCUMENTS

| | | | | |
|---|---|---|---|---|
| 2010/0328554 | A1* | 12/2010 | Shibasaki | H04N 9/3161 315/312 |
| 2011/0110103 | A1* | 5/2011 | Quadri | G02B 26/008 362/322 |
| 2012/0154767 | A1 | 6/2012 | Kimura et al. | |
| 2012/0320344 | A1 | 12/2012 | Okumura | |
| 2014/0022512 | A1* | 1/2014 | Li | G02B 6/29337 353/31 |
| 2015/0226389 | A1* | 8/2015 | Kasugai | G02B 27/141 353/31 |
| 2017/0347075 | A1* | 11/2017 | Okuda | H04N 9/3102 |

FOREIGN PATENT DOCUMENTS

| | | |
|---|---|---|
| CN | 102645826 A | 8/2012 |
| CN | 103953856 A | 7/2014 |
| CN | 105527787 A | 4/2016 |
| CN | 206946177 U | 1/2018 |
| EP | 1577700 A2 | 9/2005 |
| JP | 2013073063 A | 4/2013 |
| JP | 2013120713 A | 6/2013 |
| JP | 2014072010 A | 4/2014 |
| JP | 2015043109 A | 3/2015 |
| WO | WO-2016121720 A1 | 8/2016 |

OTHER PUBLICATIONS

First Office Action, The State Intellectual Property Office of People's Republic of China, issued to application No. 201710517567.X, dated Aug. 18, 2020.

Extended European Search Report, European Patent Office, issued to application No. 17915864.7, dated Apr. 8, 2020.

* cited by examiner

LIGHT SOURCE DEVICE AND PROJECTION SYSTEM

CROSS-REFERENCE TO RELATED APPLICATION

This is the United States national phase of International Patent Application No. PCT/CN2017/103437, filed Sep. 26, 2017, which claims priority to CN201710517567.X filed on Jun. 29, 2017, the entire contents of each of which are hereby incorporated by reference.

TECHNICAL FIELD

The present disclosure relates to the field of optical technology, and in particular, to a light source device and a projection system.

BACKGROUND

At present, most light source devices use laser light to excite fluorescent powder to generate a white light source, which has high stability and low cost. However, the excitation efficiency of the fluorescent powder is related to power and power density of the exciting light and the temperature of the fluorescent powder. Thus, when the exciting light is converged on a surface of the fluorescent powder, the fluorescent powder has low excitation efficiency due to the relatively high energy density of the exciting light, while most of light energy that is not converted by the fluorescent powder propagates in a form of heat, so that the temperature of the fluorescent powder in a region irradiated by a light spot of the exciting light is increased, thereby further reducing the excitation efficiency of the fluorescent powder.

SUMMARY

In view of the above, it is urgent to provide a light source device and a projection system with high efficiency.

A light source device includes an exciting light source for generating exciting light, a light condensing device, and a fluorescent cavity. The fluorescent cavity comprises a chamber and a fluorescent layer, wherein the chamber has a light window allowing light to enter and exit and a bottom wall opposite to the light window, and the fluorescent layer is provided on a surface of the bottom wall and on a path of light converged by the light condensing device. The exciting light is converged by the light condensing device, then incident to a surface of the fluorescent layer from the light window to form a light spot and excite the fluorescent layer to generate excited light, wherein an area of the light window is smaller than an area of the light spot, and the excited light is emitted from the light window.

A projection system includes the light source device described above.

The light source device provided by the present disclosure includes the chamber with the light window. During the exciting light being incident to the fluorescent cavity, the energy of the exciting light does not change, and the area of the light spot of the fluorescent layer is increased with respect to the area of the light window of the fluorescent cavity. In this way, when the fluorescent layer is excited by the exciting light to generate excited light, the power density of the exciting light is decreased, and the excitation efficiency is increased.

DESCRIPTION OF EMBODIMENTS

The technical solutions in the embodiments of the present disclosure will be clearly and thoroughly described below with reference to the drawings in the embodiments of the present disclosure. It should be understood that, the described embodiments are only a part of, but not all of the embodiments of the present disclosure. Based on the embodiments of the present disclosure, all other embodiments obtained by those skilled in the art without creative efforts shall fall within the protection scope of the present disclosure.

Unless defined otherwise, all technical and scientific terms used herein have the same meaning as commonly understood by those skilled in the art to which this present disclosure belongs. The term "or/and" as used herein includes any one of and all combinations of the associated listed items.

The light source device of the present disclosure can be applied to products such as projectors, laser televisions, and cinema projectors.

Embodiment 1

Figure 1:
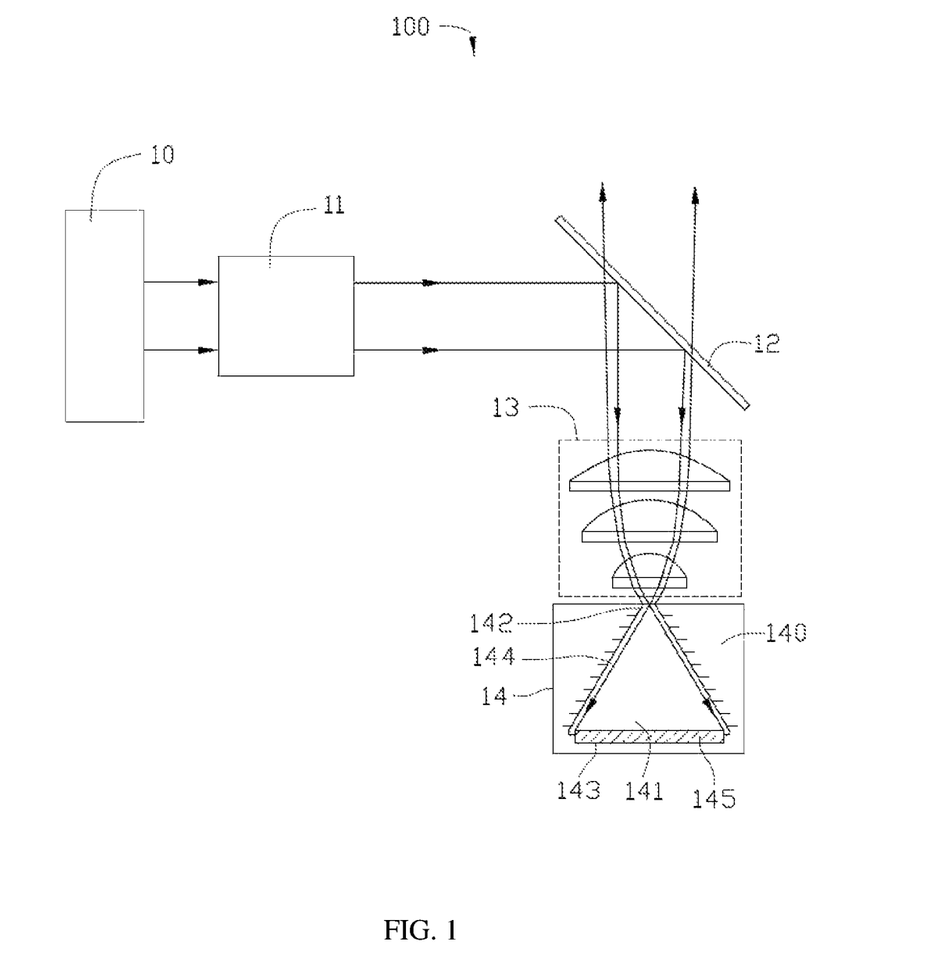
FIG. 1 is a structural schematic diagram of a light source device according to an Embodiment 1 of the present disclosure.
Figure 2:
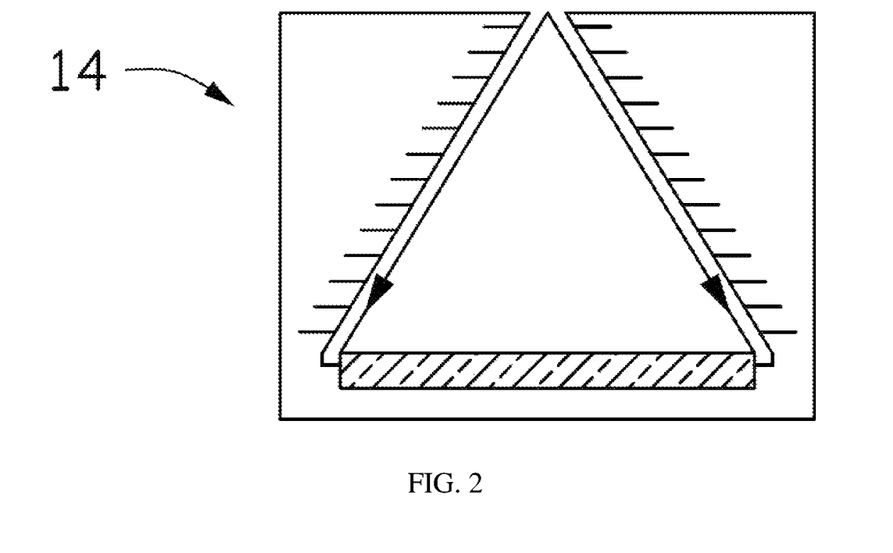
FIG. 2 is an alternative structural schematic diagram of a fluorescent cavity of the light source device in FIG. 1.
Figure 3:
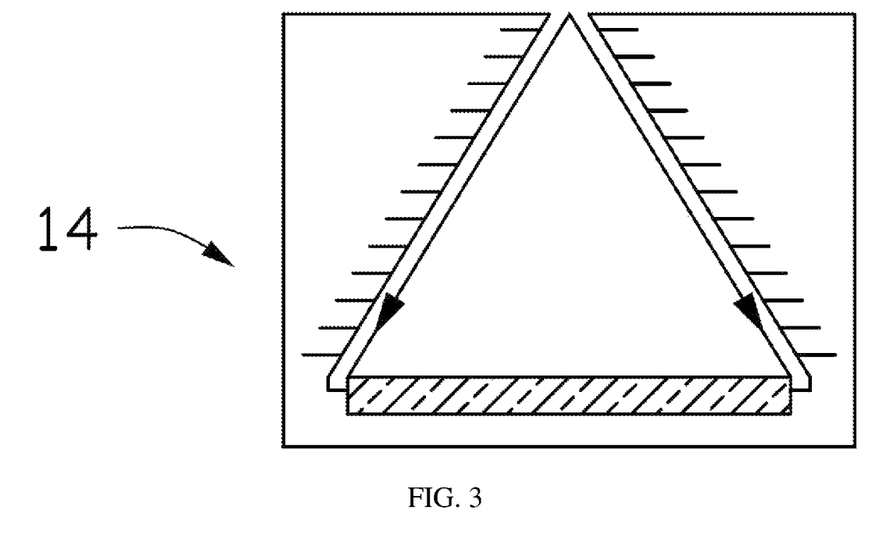
FIG. 3 is another alternative structural schematic diagram of a fluorescent cavity of the light source device in FIG. 1.
Figure 4:
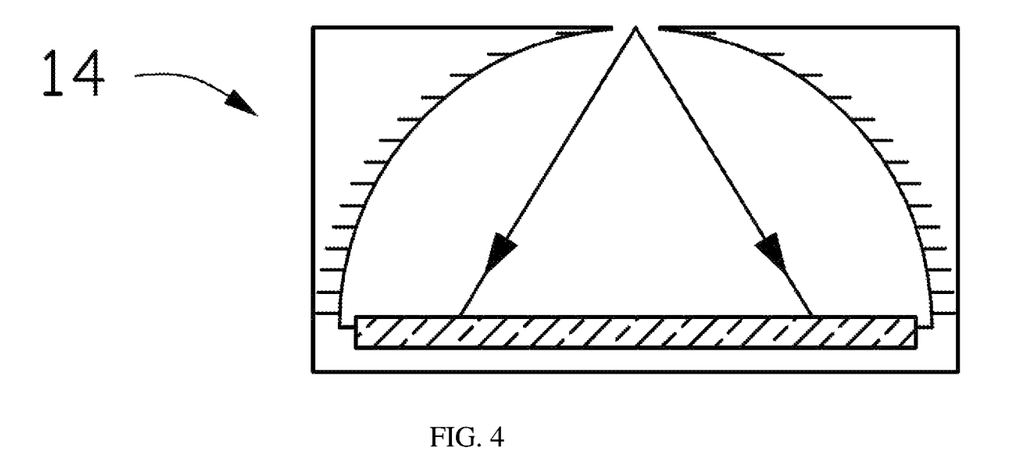
FIG. 4 is another alternative structural schematic diagram of a fluorescent cavity of the light source device in FIG. 1.
Figure 5:
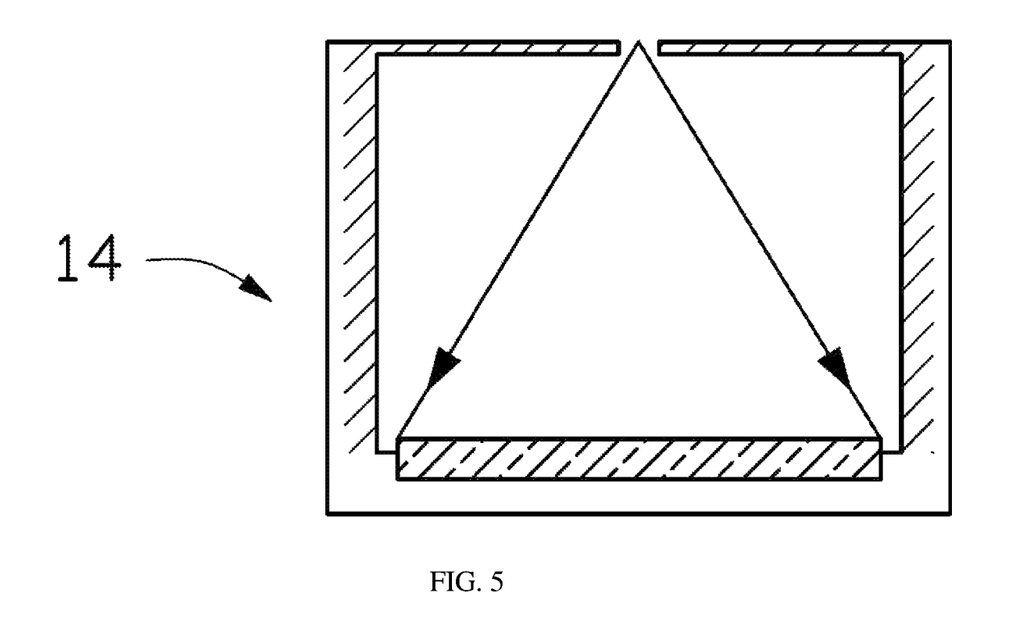
FIG. 5 is another alternative structural schematic diagram of a fluorescent cavity of the light source device in FIG. 1.

FIG. 1 is a structural schematic diagram of a light source device according to an Embodiment 1 of the present disclosure. Referring to FIG. 1, the light source device 100 includes an exciting light source 10, a light homogenizing element 11, a light splitting element 12, a light condensing device 13, and a fluorescent cavity 14. The exciting light source 10 is configured to generate exciting light. The exciting light is incident to the fluorescent cavity 14 after sequentially passing through the light homogenizing element 11, the light splitting element 12, and the light condensing device 13. Fluorescent substance in the fluorescent cavity 14 is excited by the exciting light to generate excited light. The excited light is emitted from the fluorescent cavity 14, passes through the light condensing device 13, and is finally transmitted from the light splitting element 12.

The exciting light source 10 configured to emit exciting light may be a semiconductor diode or a semiconductor diode array, such as a laser diode (LD) or a light emitting diode (LED). The exciting light may be blue light, purple light, or ultraviolet light, but it is not limited to the above. In the present embodiment, the exciting light generated by the exciting light source 10 is blue exciting light of 455 nm.

The light homogenizing element 11 is located on an optical path of the exciting light generated by the exciting light source 10, and configured to perform light homogenizing treatment on the exciting light, in order to provide the homogenized exciting light to be processed and used by the subsequent light splitting element 12, light condensing device 13, and the like.

The light splitting element 12 is located on an optical path of the exciting light emitted from the light homogenizing element 11, and it is capable of reflecting at least a part of the exciting light that reaches a surface of the light splitting element 12. In the present embodiment, the light splitting element 12 is a blue light splitting lens. The blue light splitting lens can reflect the blue exciting light.

The light condensing device 13 is located on an optical path of the exciting light reflected by the light splitting element 12. The light condensing device 13 is configured to converge the exciting light reflected by the light splitting element 12, and the exciting light converged by the light condensing device 13 is incident to the fluorescent cavity 14. In one embodiment, the light condensing device 13 can focus the exciting light irradiated thereon and form a focus. The light condensing device 13 is assembled by a plurality of lenses. In the present embodiment, the light condensing device 13 is composed of three lenses. It should be understood that in other embodiments, the number of lenses in the light condensing device 13 may be others, which is not limited in the present disclosure.

The fluorescent cavity 14 includes a casing 140, a chamber 141, and a fluorescent layer 145. The chamber 141 is formed inside the casing 140. The fluorescent layer 145 is disposed in the chamber 141.

The chamber 141 has a light window 142, a bottom wall 143, and side walls 144. The light window 142 is arranged opposite to the bottom wall 143. The side walls 144 are disposed between the light window 142 and the bottom wall 143 and connects the light window 142 with the bottom wall 143. In the present embodiment, the bottom wall 143 has a larger area than the light window 142, and a shape of the chamber 141 is substantially a cone shape. Referring to FIG. 2 to FIG. 5 in combination, in other alternative embodiments, the chamber 141 may also have a pyramid shape, a spherical shape, an ellipsoid shape, a cylindrical shape, or a prism shape, which is not limited in the present disclosure.

The light window 142 is located on top of the casing 140. It should be understood that the light window 142 is also located on the top of the chamber 141. The light window 142 serves as an entrance and exit through which the light enters and exits from the chamber 141. In the present embodiment, the light window 142 has a circular shape. Without doubt, in an alternative embodiment, the light window 142 may also be square, rectangular, or oval, which is not limited in the present disclosure.

Specifically, the exciting light is incident into the chamber 141 through the light window 142 after being converged by the light condensing device. All the excited light is emitted from the chamber 141 through the light window 142. In the present embodiment, a plane where the light window 142 is located is perpendicular to the direction of the exciting light reflected by the light splitting element 12. The light window 142 is near the focus of the exciting light converged by the light condensing device 13. In the present embodiment, the focus is located in the light window 142. Further, the focus is exactly located at a center of the light window 142.

The bottom wall 143 is located at a bottom of the chamber 141. The bottom wall 143 is arranged opposite to the light window 142. In the present embodiment, the area of the bottom wall 143 is obviously larger than the area of the light window 142.

The side wall 144 includes a reflective layer (not shown). The reflective layer is disposed on a surface of the side wall 144. The reflective layer is configured to reflect the excited light, such that the excited light can be emitted from the light window 142; or, it is configured to reflect the excited light one or more times, such that the light can reach the fluorescent layer 145 again and excite the fluorescent layer 145 again to generate excited light.

The fluorescent layer 145 is disposed on a surface of the bottom wall 143. The fluorescent layer 145 is excited by the exciting light irradiated to the surface thereof and generates the excited light. The fluorescent layer 145 is also arranged opposite to the light window 142. The exciting light enters the chamber through the light window 142 and is directly irradiated to the surface of the fluorescent layer 145 to excite the fluorescent layer 145 and generate excited light. It can be understood that the area of the fluorescent layer 145 may be the same as that of the bottom wall 143 or smaller than that of the bottom wall 143. The excited light reaches the fluorescent layer 145 and generates a light spot after passing through the light window 142. It can be understood that the area of the light spot is much larger than the area of the focus. In addition, the light spot is located in a range of the fluorescent layer 145. Preferably, the area of the fluorescent layer 145 is the same as the area of the bottom wall 143.

In order to explain a light emitting principle of the light source device 100, a light emitting process of the light source device 100 is generally described below.

At first, the exciting light is generated by the exciting light source 10. The exciting light sequentially passes through the light homogenizing element 11, the light splitting element 12, and the light condensing device 13 and is finally incident to the chamber 141.

The exciting light passes through the light condensing device 13 and is converged and focused to form the focus. The focus may be located near the light window 142 or located just in the light window 142. In other words, the light window 142 may be located near above or below the focus, so that the exciting light is incident to the chamber 141 as much as possible.

It can be understood that as the light travels in a straight line, the exciting light may diffuse when passing through the light window 142 and incident on the fluorescent layer 145, and thus the light spot formed on the fluorescent layer 145 may be larger than a cross section of the exciting light incident in the light window. The area of the fluorescent layer 145 is larger than the area of the light spot, and thus the light spot is completely located within the range of the fluorescent layer 145. In other words, the light window 142 is relatively close to the focus, and the fluorescent layer 145 is relatively far from the focus, such that the area of the light spot formed on the fluorescent layer 145 is larger than the cross-sectional area of the exciting light incident at the light window 142.

After the exciting light is irradiated to the fluorescent layer 145, the fluorescent layer 145 generates excited light, and the excited light is reflected in a form of Lambertian light. In the chamber 141, the excited light in small-angle is directly emitted from the light window 142 of the chamber 141 at a small angle; the excited light in large-angle is reflected by the side walls 144 and the bottom wall 143 one or more times and is finally emitted from the light window 142 at a small angle. In other words, all the excited light is emitted from the light window 142 at a small angle, thereby increasing a collection efficiency of the light condensing device 13. In other words, the fluorescent cavity 14 has a structure of the chamber 141 in which the light window 142 is smaller than the bottom wall 143, such that the bottom wall 143 has a greater optical extend than the light window 142, thereby increasing the collection efficiency.

After the excited light is emitted from the light window 142, it passes through the light condensing device 13 again. It can be understood that, at this time, the light condensing device 13 has a divergent effect on the excited light, and the excited light diverged by the light condensing device 13 finally reaches the light splitting element 12 and is transmitted through the light splitting element 12.

Embodiment 2

Figure 6:
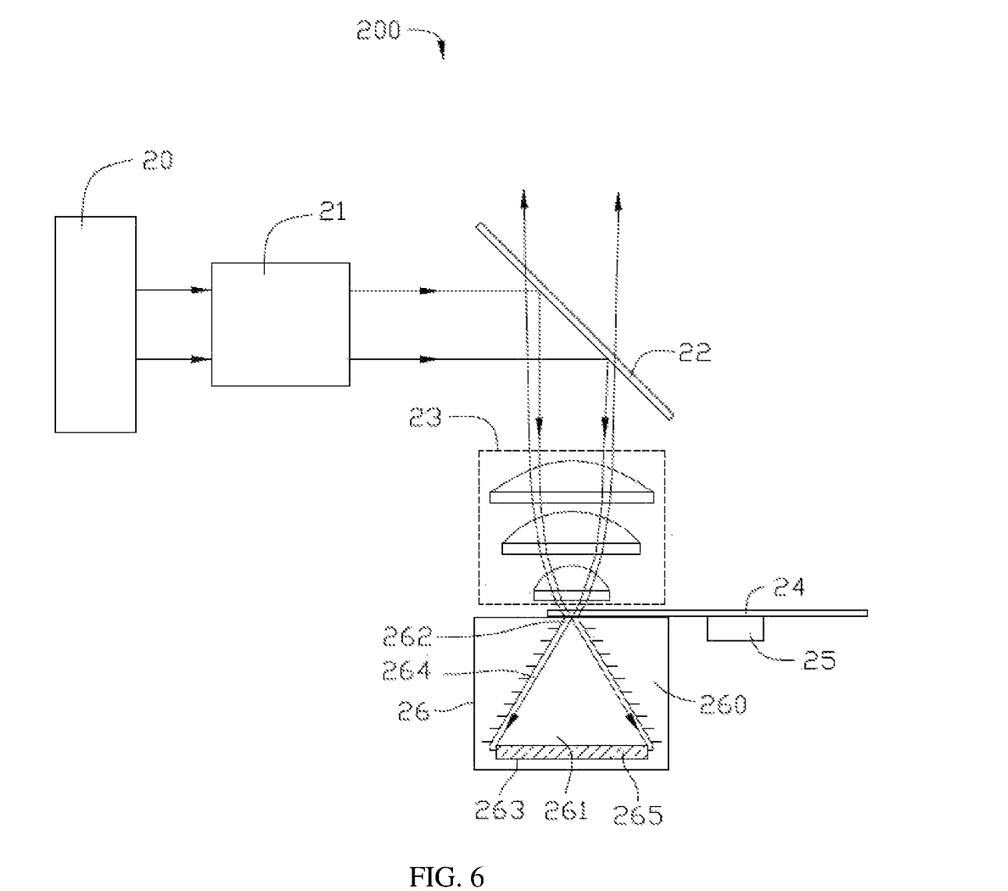
FIG. 6 is a structural schematic diagram of a light source device according to an Embodiment 2 of the present disclosure.

FIG. 6 is a structural schematic diagram of a light source device according to an Embodiment 2 of the present disclosure is illustrated. Referring to FIG. 6, the light source device 200 includes an exciting light source 20, a light homogenizing element 21, a light splitting element 22, a light condensing device 23, a pattern plate 24, a first driving device 25, and a fluorescent cavity 26.

Similar to parts of the structure of the Embodiment 1, in the present embodiment, exciting light is also generated by the exciting light source 20. The exciting light sequentially passes through the light homogenizing element 21, the light splitting element 22, and the light condensing device 23. The present embodiment differs from the Embodiment 1 in that, after the exciting light passes through the light condensing device 23, it first passes through the pattern plate 24 and then is incident to the fluorescent cavity 26. The first driving device 25 is connected to the pattern plate 24 and drives the pattern plate 24 to move.

The structures of the exciting light source 20, the light homogenizing element 21, the light splitting element 22, the light condensing device 23, and the fluorescent cavity 26 in the present embodiment are respectively the same as the structures of the exciting light source 10, the light homogenizing element 11, the light splitting element 12, the light condensing device 13, and the fluorescent cavity 14 in the Embodiment 1, which are not described in detail herein again.

Figure 7:
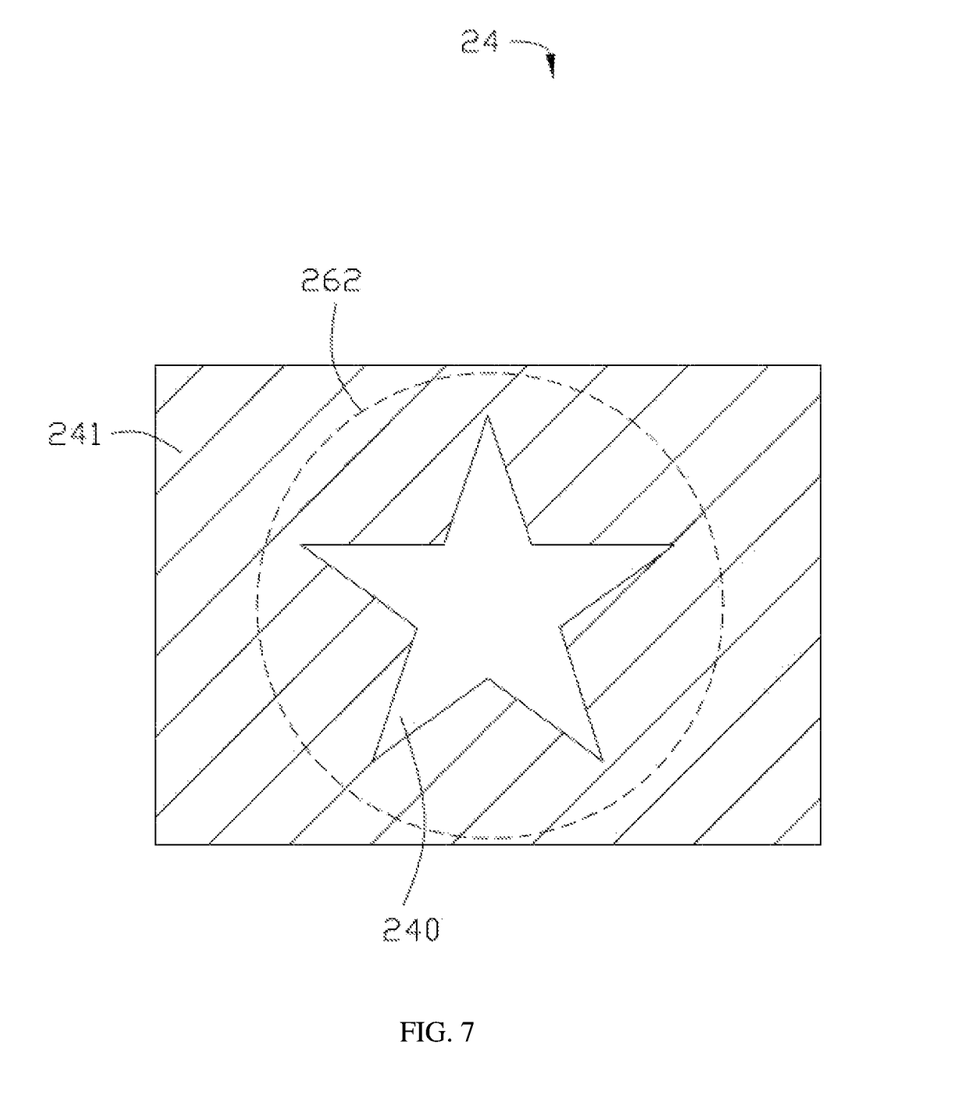
FIG. 7 is a structural schematic diagram of a pattern plate of the light source device shown in FIG. 6.

Referring to FIG. 7 in combination, the pattern plate 24 is disposed between the light condensing device 23 and the fluorescent cavity 26 and located on an optical path of the exciting light emitted from the light condensing device 23. Through the pattern plate 24, the emitted excited light have a shape of a pattern of the pattern plate. The pattern plate 24 includes a first region 240 and a second region 241. The second region 241 is disposed around the first region 240.

The first region 240 is a central pattern region, and a pattern of the first region 240 can be designed according to specific requirements. In the present embodiment, the first region 240 is in a pentagonal star pattern. In other embodiments, the first region 240 may also have other shapes, for example, a circular, square, or rectangular pattern, which is not limited in the present disclosure.

In addition, a surface of the first region 240 facing towards the light condensing device 23 is provided with an anti-reflection film, and the anti-reflection film is configured to transmit the exciting light and reduce reflection of the exciting light.

The second region 241 is disposed around the first region 240. The second region 241 is a non-pattern region. A surface of the second region 241 facing towards the light condensing device 23 is provided with a filter film, and the filter film is configured to reflect the excited light and transmit the exciting light. In the present embodiment, the filter film is configured to transmit blue exciting light.

The driving device 25 is connected to the pattern plate 24 and can drive the pattern plate 24 to rotate.

Similarly, the fluorescent cavity 26 is similar in structure to the fluorescent cavity 14 in the Embodiment 1. The fluorescent cavity 26 in the present embodiment also includes a casing 260, a chamber 261, and a fluorescent layer 265. Similarly, the exciting light, after incident into the chamber 261, excites the fluorescent layer 265 to generate excited light. In addition, the chamber 261 also has a light window 262, a bottom wall 263, and side walls 264. The chamber 261 has the same structure as the chamber 141 in the Embodiment 1, which is not described in detail herein. Without doubt, the chamber 261 may also be in the shape of a pyramid shape, a spherical shape, an ellipsoid shape, a cylindrical shape, or a prism shape, which is not limited in the present disclosure.

In addition, the light window 262 has a larger area than the first region 240. In the present embodiment, the first region 240 is located within a range of the projection of the light window 262 on a surface of the pattern plate 24.

The present embodiment differs from the Embodiment 1 in that after the exciting light passes through the light condensing device 23, it reaches a top surface of the pattern plate 24, then further passes through the pattern plate 24, and is incident to the chamber 261 from the light window 262. Specifically, the exciting light converged by the light condensing device 23 is incident to the chamber 261 from the first region 240 of the pattern plate 24.

The exciting light irradiates the fluorescent layer 265 and then excites the fluorescent layer 265 to generate excited light which is reflected in the form of Lambertian light. In the chamber 261, the excited light in small-angle is directly emitted from the light window 262 of the chamber 261 at a small angle, and if it is irradiated to the first region 240 of the pattern plate 24, a part of the excited light is emitted after passing through the first region 240, then passes through the light condensing device 23 and is finally transmitted from the light splitting element 22; the other part of the excited light is irradiated to the second region 241 of the pattern plate 24, and the excited light is reflected by the second region 241 and then return to the chamber 261, so that it can be continuously reflected, it is finally emitted from the first region 240 after being reflected by the side wall 264 and the bottom wall 263 for one or more times.

Embodiment 3

Figure 8:
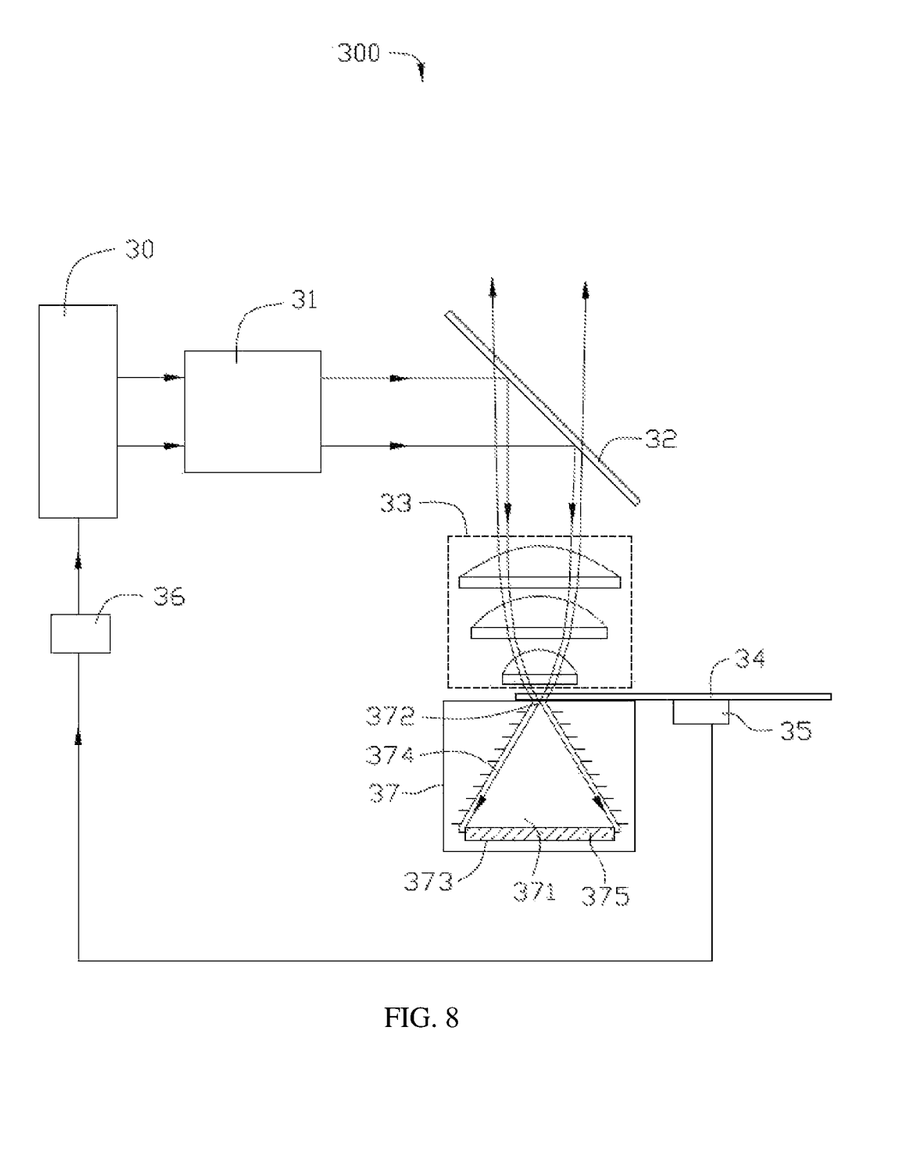
FIG. 8 is a structural schematic diagram of a light source device according to an Embodiment 3 of the present disclosure.

FIG. 8 is a structural schematic diagram of a light source device according to an Embodiment 3 of the present disclosure. Referring to FIG. 8, the light source device 300 includes an exciting light source 30, a light homogenizing element 31, a light splitting element 32, a light condensing device 33, a pattern plate 34, a first driving device 35, a control device 36, and a fluorescent cavity 37. Similar to the structure in the Embodiment 2, in the present embodiment, exciting light is also generated by the exciting light source 30. The exciting light sequentially passes through the light homogenizing element 31, the light splitting element 32, the light condensing device 33, and the pattern plate 34, and then it is incident to the fluorescent cavity 37 and generates excited light in the fluorescent cavity 37. The first driving device 25 drives the pattern plate 24 to move. The present embodiment differs from the Embodiment 2 in that the light source device 300 in the present disclosure further includes a control device 36, and the control device 36 is respectively electrically connected to the exciting light source 30 and the first driving device 35.

Similarly, the structure of the fluorescent cavity 37 is similar to that of the fluorescent cavity 14 in the Embodiment 1 The fluorescent cavity 37 in the present embodiment also includes a casing 370, a chamber 371, and a fluorescent layer 375. Similarly, the exciting light is incident to the chamber 371 and then excites the fluorescent layer 375 to generate excited light. In addition, the chamber 371 also has a light window 372, a bottom wall 373, and a side wall 374. The exciting light is incident into the chamber 371 through the light window 372, and the structure of the chamber 371 is the same as the basic structure of the chamber 141 in the Embodiment 1, which is not described in detail herein.

In the present embodiment, since the excited light emitted from the light window 372 of the fluorescent cavity 37 is reflected in the second region and incident to the fluorescent cavity 37 again to be used, until it is emitted from the first region of the pattern plate 34. Therefore, when the first region of the pattern plate 34 adopts different patterns and thus has different areas, illuminance formed by the exciting light emitted from the fluorescent cavity 37 in the first region is also different, which will result in inconsistence of the brightness of the projection image. The illuminance=luminous flux/illumination area. Therefore, it is required that the ratio of the luminous flux of the illumination light to the illumination area is constant to achieve the consistency of the illuminance.

In the present embodiment, the control device 36 is disposed between the exciting light source 30 and the first driving device 35. The control device 36 is respectively electrically connected to the exciting light source 30 and the first driving device 35. Specifically, the control device 36 can monitor and receive status information from the first driving device 35 and accordingly adjusts power of the exciting light source 30 based on the received status information. In other words, the control device 36 controls the power of the exciting light by controlling the driving current of the exciting light source 30 and further controls, in such a manner, the luminous flux generated by the fluorescent cavity 37. For example, the ratio of areas of the patterns 1, 2, and 3 in the first region of the pattern plate 34 is 4:5:3. The pattern plate 34 is rotated by the first driving device 35 until the light window 370 of the fluorescent cavity 37 is aligned with the patterns 1, 2, and 3, respectively, the control device 36 controls the ratio of the power of the exciting light of the exciting light source 30 to be 4:5:3, so as to achieve the consistency of the illuminance.

Embodiment 4

Figure 9:
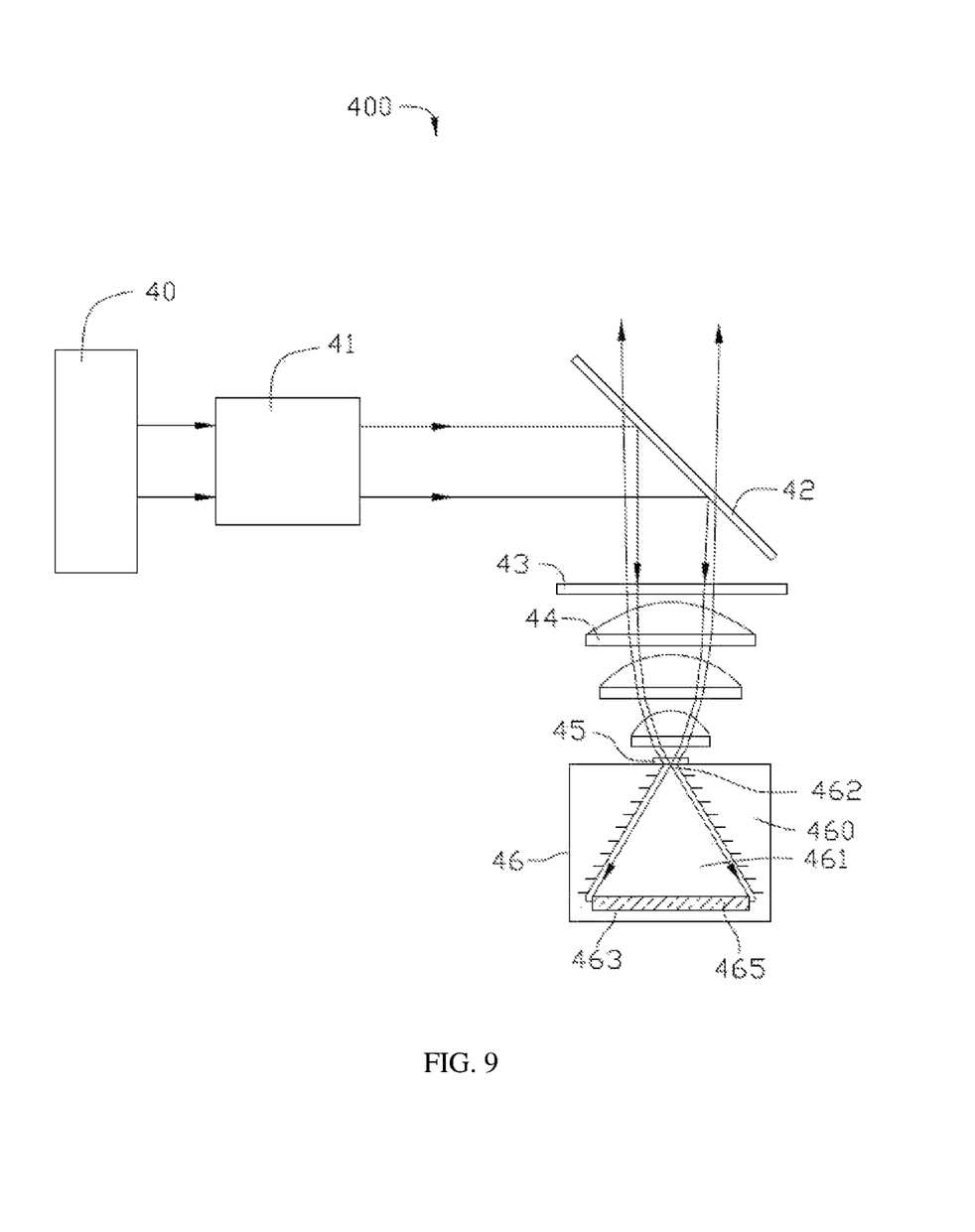
FIG. 9 is a structural schematic diagram of a light source device according to an Embodiment 4 of the present disclosure.

FIG. 9 is a structural schematic diagram of a light source device according to an Embodiment 4 of the present disclosure. As shown in FIG. 9, the light source device 400 includes an exciting light source 40, a light homogenizing element 41, a light splitting element 42, a quarter wave-plate 43, a light condensing device 44, a light splitting lens 45, and a fluorescent cavity 46. The exciting light source 40 generates exciting light. The exciting light sequentially passes through the light homogenizing element 41, the light splitting element 42, the quarter wave-plate 43, the light condensing device 44, and the light splitting lens 45, and then it is incident into the fluorescent cavity 46. The fluorescent substance in the fluorescent cavity 44 is excited by the exciting light to generate excited light which is emitted from the fluorescent cavity 46 and finally transmitted out from the light splitting element 42 after passing through the light splitting lens 45, the light condensing device 44, the quarter wave-plate 43, and the light splitting element 42.

In the present embodiment, the exciting light source 40 is a laser of s-polarized blue light, and configured to generate s-polarized blue exciting light.

The structure of the light homogenizing element 41 is basically the same as that of the light homogenizing element 11 in the Embodiment 1, which is not described in detail herein.

The light splitting element 42 is located on the optical path of the exciting light emitted from the light homogenizing element 41. A polarizing film (not shown) is disposed on a surface of the light splitting element 42 facing towards the light homogenizing element 41. The polarizing film is a polarizing film corresponding to a blue light band, and it can reflect the s-polarized blue exciting light and transmit p-polarized blue exciting light. Therefore, the light splitting element 42 can reflect the s-polarized blue exciting light passing through the light homogenizing element 41.

The quarter wave-plate 43 is located on the optical path of the light reflected by the light splitting element 42. In the present embodiment, the quarter wave-plate 43 is disposed between the light splitting element 42 and the light condensing device 44 and close to a top surface of the light condensing device 44. The quarter wave-plate 43 is located on the optical path of the exciting light reflected by the light splitting element 42 and receives the exciting light reflected by the light splitting element 42, and it is perpendicular to the direction of the exciting light reflected by the light splitting element 42. In other words, the exciting light emitted by the light splitting lens 42 is perpendicularly incident to the quarter wave-plate 43. The quarter wave-plate 43 is configured to change the polarization state of the exciting light. In the present embodiment, the quarter wave-plate is configured to change the s-polarized blue exciting light into the p-polarized blue exciting light.

The light condensing device 44 is on the optical path of the exciting light emitted from the quarter wave-plate 43 and converges the exciting light passing through the light condensing device 44. The structure of the light condensing device 44 is basically the same as that of the light condensing device 13 in the Embodiment 1, which is not described in detail herein.

The structure of the fluorescent cavity 46 is also similar to that of the fluorescent cavity 14 in the Embodiment 1. The fluorescent cavity 46 in the present embodiment also includes a casing 460, a chamber 461, and a fluorescent layer 465. The chamber 461 has a light window 462, a bottom wall 463, and side walls. The structure and the principle for generating exciting light of the chamber 461 are the same as those of the chamber 141 in the Embodiment 1, which is not described in detail herein.

The light splitting lens 45 is located on the optical path of the exciting light emitted from the light condensing device 44. Specifically, the light splitting lens 45 is disposed between the light condensing device 44 and the fluorescent cavity 46 and close to the top of the fluorescent cavity 46.

Further, the light splitting lens 45 is disposed on and covers top of the light window 462. The light splitting lens 45 is configured to reflect a part of the exciting light and transmit the remaining part of the exciting light. In the present embodiment, the light splitting lens 45 can reflect 20% of the exciting light irradiated onto the surface thereof and transmit the remaining 80% of the exciting light, and the transmitted exciting light is incident to the fluorescent cavity 46 through the light window 462. In this case, the excited light is generated after the exciting light is incident to the fluorescent cavity 46, as in the Embodiment 1, which is not limited in the present disclosure.

The excited light is emitted from the light window 462 and is first transmitted through the light splitting lens 45. The excited light transmitted through the light splitting lens 45 and the exciting light reflected by the light splitting lens 45 are mixed to form white light. The white light passes through the light condensing device 44 and the quarter wave-plate 43, sequentially. In this case, the exciting light reflected by the light splitting lens 45 has passed through the quarter wave-plate 43 twice, and thus the exciting light is transformed to the p-polarization state from the s-polarization state, and is finally emitted through the light splitting element 42.

Embodiment 5

Figure 10:
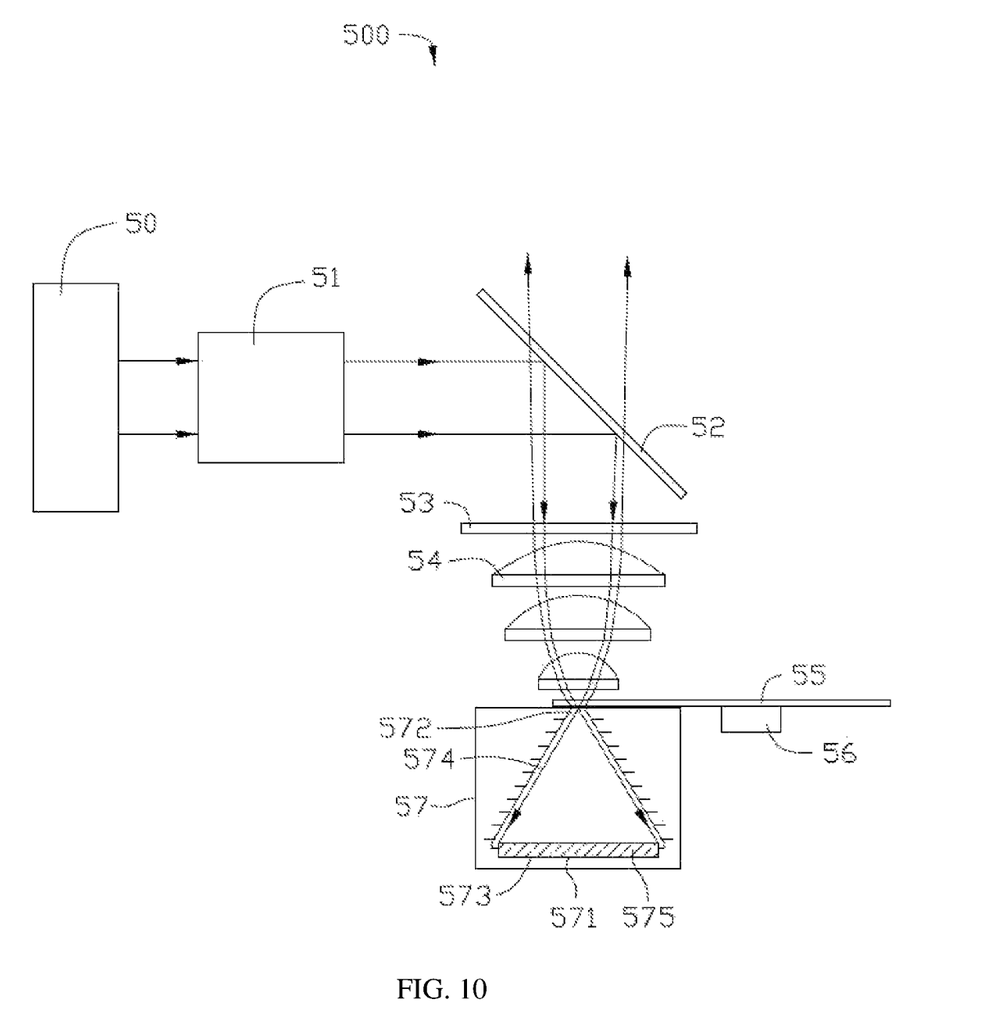
FIG. 10 is a structural schematic diagram of a light source device according to an Embodiment 5 of the present disclosure.

FIG. 10 is a structural schematic diagram of a light source device according to an Embodiment 5 of the present disclosure. As shown in FIG. 10, the light source device 500 includes an exciting light source 50, a light homogenizing element 51, a light splitting element 52, a quarter wave-plate 53, a light condensing device 54, a filter wheel 55, a first driving device 56, and a fluorescent cavity 57.

The exciting light source 50 generates exciting light. The exciting light is incident into the fluorescent cavity 57 after passing through the light homogenizing element 51, the light splitting element 52, the quarter wave-plate 53, the light condensing device 54, and the filter wheel 55, sequentially. The fluorescent substance in the fluorescent cavity 57 is excited by the exciting light to generate excited light, and the excited light is emitted from the fluorescent cavity 57, and is finally emitted from the light splitting element 52 after sequentially passing through the filter wheel 55, the light condensing device 54, the quarter wave-plate 53, and the light splitting element 52. The first driving device 56 is connected to the filter wheel 55 and drives the filter wheel 55 to rotate.

The structures of the exciting light source 50, the light homogenizing element 51, the light splitting element 52, the quarter wave-plate 53, and the light condensing device 54 in the present embodiment are respectively the same as the corresponding structures of the exciting light source 40, the light homogenizing element 41, the light splitting element 42, the quarter wave-plate 43 and the light condensing device 44 in the Embodiment 4, which is not described in detail herein.

Figure 11:
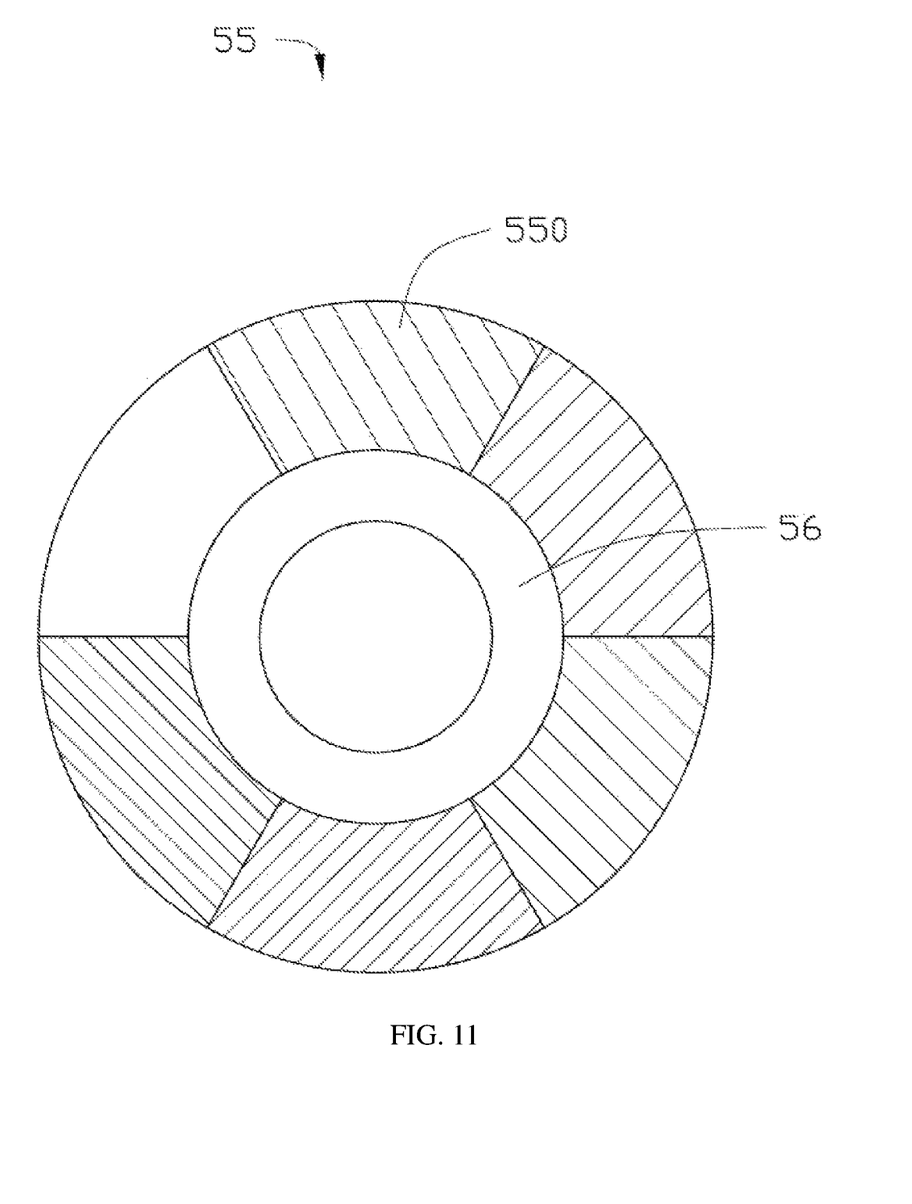
FIG. 11 is a structural schematic diagram of a filter wheel of the light source device in FIG. 10.

The filter wheel 55 includes a plurality of regions, and each of the regions is provided with one of filter sheets 550 having different transmittances for the exciting light. For example, multiple filter sheets 550 are provided. Since the exciting light source 50 in the present embodiment is a laser of s-polarized blue light and configured to generate s-polarized blue exciting light, the regions on the filter wheel 55 are provided with filter sheets 550 having different transmittances for the blue exciting light, respectively.

In the light source device 500 of the present embodiment, the filter wheel 55 and the first driving device 56 replace the light splitting lens of the Embodiment 4 together, so as to achieve adjustment of a dynamic color temperature. Specifically, as shown in FIG. 11, FIG. 11 is a structural schematic diagram of a filter wheel of the light source device 500 shown in FIG. 10.

The fluorescent cavity 57 also has a similar structure as the fluorescent cavity 57 in the Embodiment 1. The fluorescent cavity 57 in the present embodiment also includes a casing 570, a chamber 571, and a fluorescent layer 575. The chamber 571 has a light window 572, a bottom wall 573, and side walls 574. The structure and the principle for generating exciting light of the chamber 571 are the same as those of the chamber 141 in the Embodiment 1, which is not described in detail herein.

The filter wheel 55 is disposed at the light window 572 of the fluorescent cavity 57 and driven to rotate by the first driving device 56. When the filter wheel 55 rotates to a position where the filter sheet 550 with a high transmittance to the blue exciting light directly faces the light window 572, the blue exciting light used for exciting the fluorescent layer 575 in the fluorescent cavity 57 is relatively more, and the blue exciting light that is reflected is relatively less. That is, the blue exciting light is relatively less in the spectrum of the emitted illumination light, and thus the illumination system has a relatively low color temperature.

When the filter wheel 55 rotates to a position where the filter sheet 550 with a low transmittance to the blue exciting light directly faces the light window 572, the blue exciting light used for exciting the fluorescent layer 575 in the fluorescent cavity 57 is relatively less, and the blue exciting light that is reflected is relatively more. That is, the blue exciting light is relatively more in the spectrum of the emitted illumination light, and thus the illumination system has a relatively high color temperature. In this way, through controlling the rotation of the filter wheel 55 by the first driving device 56, the dynamic color temperature of the light source device 500 can be adjusted.

The present disclosure also provides a projection system (not shown), and the projection system includes a light source device, which may be the light source device described in any of the above embodiments.

In view of the above, on the one hand, since the area of the light window of the fluorescent cavity is smaller than the area of the fluorescent layer, energy of the exciting light does not change during the process of being incident into the fluorescent cavity. In this case, the size of the light spot on the fluorescent layer is significantly larger than the size of the light window. It can be understood that the distance between the light window and the focus is much shorter than the distance between the fluorescent layer and the focus. In this case, as the size of the light spot on the fluorescent layer is significantly larger than the size of the light window, the power density of the exciting light decreases and the excitation efficiency increases during the excitation of the fluorescent layer by the exciting light. In addition, the area of the fluorescent layer is relatively larger, and thus a heat dissipation region on a back surface of the fluorescent layer is greatly increased, such that a relatively large heat exchange area reduces a thermal saturation effect of the fluorescent substance, thereby further improving the excitation efficiency of the fluorescent substance.

On the other hand, the excited light is reflected in the form of Lambertian light. In the fluorescent cavity, the excited light in small-angle is directly emitted from the light window of the fluorescent cavity, and the excited light in large-angle is repeatedly reflected by the inner side walls and the bottom wall, finally emitted from the light window at a small angle. That is, all the excited light emitted from the light window of the fluorescent cavity is emitted at a small angle, which improves the collection efficiency of the light condensing device. That is, since the fluorescent cavity has a structure in which the light window is smaller than the bottom wall, the optical extend of bottom wall is greater than that of the light window, thereby increasing the collection efficiency.

The above embodiments are only intended to illustrate, the technical solutions of the present disclosure, but not to limit the scope. Although the present disclosure has been described in detail with reference to the above preferred embodiments, those skilled in the art can make modification or equivalent replacement to the technical solutions of the present disclosure without departing from the spirit and scope of the technical solution of the present disclosure.

What is claimed is:

1. A light source device, comprising:
an exciting light source for generating exciting light;
a light condensing device; and
a fluorescent cavity,
wherein the fluorescent cavity comprises a chamber and a fluorescent layer, the chamber having a light window allowing light to enter and exit and a bottom wall opposite to the light window, and the fluorescent layer being provided on a surface of the bottom wall;
wherein the exciting light is converged by the light condensing device, then incident to a surface of the fluorescent layer from the light window to form a light spot which excites the fluorescent layer to generate excited light, wherein an area of the light window is smaller than an area of the light spot, and the excited light is emitted from the light window;
wherein the light condensing device is configured to converge the exciting light to form a focus located at the light window;
wherein the light source device further comprises a pattern plate which is disposed between the light condensing device and the light window, and configured to limit the emitted excited light to be in a pattern shape of the pattern plate;
wherein the light source device further comprises a first driving device, wherein the first driving device is connected to the pattern plate and configured to drive the pattern plate to rotate;
wherein a control device is provided between the exciting light source and the first driving device, the control device being electrically connected to the exciting light source and the first driving device respectively, and configured to receive status information from the first driving device and to control light emitting power of the exciting light source by controlling a driving current of the exciting light source based on the received status information of the first driving device; and
wherein the light source device further comprises a light splitting lens, wherein the light splitting lens is disposed between the light condensing device and the fluorescent cavity, and located on an optical path of the exciting light emitted from the light condensing device, and the light splitting lens is configured to reflect a part of the exciting light and transmit a remaining part of the exciting light, and the remaining part of the exciting light transmitted by the light splitting lens is incident into the chamber through the light window.

2. The light source device according to claim 1, wherein the chamber further comprises a side wall which connects the light window with the bottom wall and comprises a reflective layer capable of reflecting the excited light, and the excited light, after being reflected one or more times by the reflective layer, is emitted from the light window.

3. The light source device according to claim 1, wherein the chamber is in one of a cone shape, a pyramid shape, a spherical shape, an ellipsoid shape, a cylindrical shape, or a prism shape.

4. The light source device according to claim 1, further comprising a light homogenizing element, wherein the exciting light emitted from the exciting light source is homogenized by the light homogenizing element.

5. The light source device according to claim 4, further comprising a light splitting element, wherein the light splitting element receives the exciting light homogenized by the light homogenizing element, and is configured to reflect a part of the exciting light and transmit the excited light.

6. The light source device according to claim 5, wherein and the light condensing device is further configured to collect and output the excited light to the light splitting element, and then the excited light is transmitted through the light splitting element.

7. The light source device according to claim 5, wherein the exciting light comprises s-polarized exciting light, and the light splitting element comprises a polarizing coating film, which is configured to reflect the s-polarized exciting light.

8. The light source device according to claim 7, further comprising a quarter wave-plate, wherein the quarter wave-plate is disposed between the light splitting element and the light condensing device and located on an optical path of the exciting light reflected by the light splitting element, and the quarter wave-plate is configured to change a polarization state of the exciting light.

9. The light source device according to claim 8, further comprising a filter wheel and a second driving device, wherein the filter wheel is disposed between the light condensing device and the light window, the second driving device is connected to the filter wheel and configured to drive the filter wheel to rotate, and wherein a plurality of regions are provided on the filter wheel, wherein each of the plurality of regions comprises a filter, and the filters of the plurality of regions have different transmittances to the exciting light.

10. The light source device according to claim 1, wherein the pattern plate comprises a first region and a second region, wherein the first region is plated with an anti-reflection film configured to transmit the exciting light and reduce reflection of the exciting light, and the second region is plated with a filter film configured to reflect the excited light and transmit the exciting light.

11. The light source device according to claim 1, wherein the light splitting lens is configured to reflect 20% of the exciting light reaching its surface and transmit the remaining 80% of the exciting light.

12. The light source device according to claim 1, wherein the control device is configured to control a ratio of a power of the exciting light of the exciting light source to be the same as a ratio of areas of the patterns of the pattern plate.

13. A projection system comprising a light source device, which comprises:
an exciting light source for generating exciting light;
a light condensing device; and
a fluorescent cavity, wherein the fluorescent cavity comprises a chamber and a fluorescent layer, the chamber having a light window allowing light to enter and exit and a bottom wall opposite to the light window, and the fluorescent layer being provided on a surface of the bottom wall;

wherein the exciting light is converged by the light condensing device, then incident to a surface of the fluorescent layer from the light window to form a light spot which excites the fluorescent layer to generate excited light, wherein an area of the light window is smaller than an area of the light spot, and the excited light is emitted from the light window;

wherein the light condensing device is configured to converge the exciting light to form a focus located at the light window;

wherein the light source device further comprises a pattern plate which is disposed between the light condensing device and the light window, and is configured to limit the emitted excited light to be in a pattern shape of the pattern plate;

wherein the light source device further comprises a first driving device, wherein the first driving device is connected to the pattern plate and configured to drive the pattern plate to rotate;

wherein a control device is provided between the exciting light source and the first driving device, the control device being electrically connected to the exciting light source and the first driving device respectively, and configured to receive status information from the first driving device and to control light emitting power of the exciting light source by controlling a driving current of the exciting light source based on the received status information of the first driving device; and wherein the light source device further comprises a light splitting lens, wherein the light splitting lens is disposed between the light condensing device and the fluorescent cavity, and located on an optical path of the exciting light emitted from the light condensing device, and the light splitting lens is configured to reflect a part of the exciting light and transmit a remaining part of the exciting light, and the remaining part of the exciting light transmitted by the light splitting lens is incident into the chamber through the light window.

14. The projection system according to claim 13, wherein the chamber further comprises a side wall which connects the light window with the bottom wall and comprises a reflective layer capable of reflecting the excited light, and the excited light, after being reflected one or more times by the reflective layer, is emitted from the light window.

15. A light source device, comprising:
an exciting light source for generating exciting light;
a light condensing device;
a fluorescent cavity;
a light splitting element; and
a quarter wave-plate,
wherein the fluorescent cavity comprises a chamber and a fluorescent layer, the chamber having a light window allowing light to enter and exit and a bottom wall opposite to the light window;

wherein the exciting light is converged by the light condensing device, then incident to a surface of the fluorescent layer from the light window to form a light spot which excites the fluorescent layer to generate excited light, wherein an area of the light window is smaller than an area of the light spot, and the excited light is emitted from the light window;

wherein the exciting light comprises first polarized exciting light, and the light splitting element comprises a polarizing coating film, which is configured to reflect the first polarized exciting light;

wherein the quarter wave-plate is disposed between the light splitting element and the light condensing device, is located on an optical path of the first polarized exciting light reflected by the light splitting element, and is configured to change a polarization state of all of the reflected first polarized exciting light; and wherein the light source device further comprises a light splitting lens, wherein the light splitting lens is disposed between the light condensing device and the fluorescent cavity, and located on an optical path of the exciting light emitted from the light condensing device, and the light splitting lens is configured to reflect a part of the exciting light and transmit a remaining part of the exciting light, and the remaining part of the exciting light transmitted by the light splitting lens is incident into the chamber through the light window.

16. The light source device according to claim 15, wherein the chamber further comprises a side wall which connects the light window with the bottom wall and comprises a reflective layer capable of reflecting the excited light, and the excited light, after being reflected one or more times by the reflective layer, is emitted from the light window.

* * * * *